March 13, 1945. J. L. ANDERSON 2,371,209
SKELP WELDING UNIT WITH ROLLS
Filed Sept. 17, 1940 4 Sheets-Sheet 3

INVENTOR
James L. Anderson
BY J. F. Brandenburg
ATTORNEY

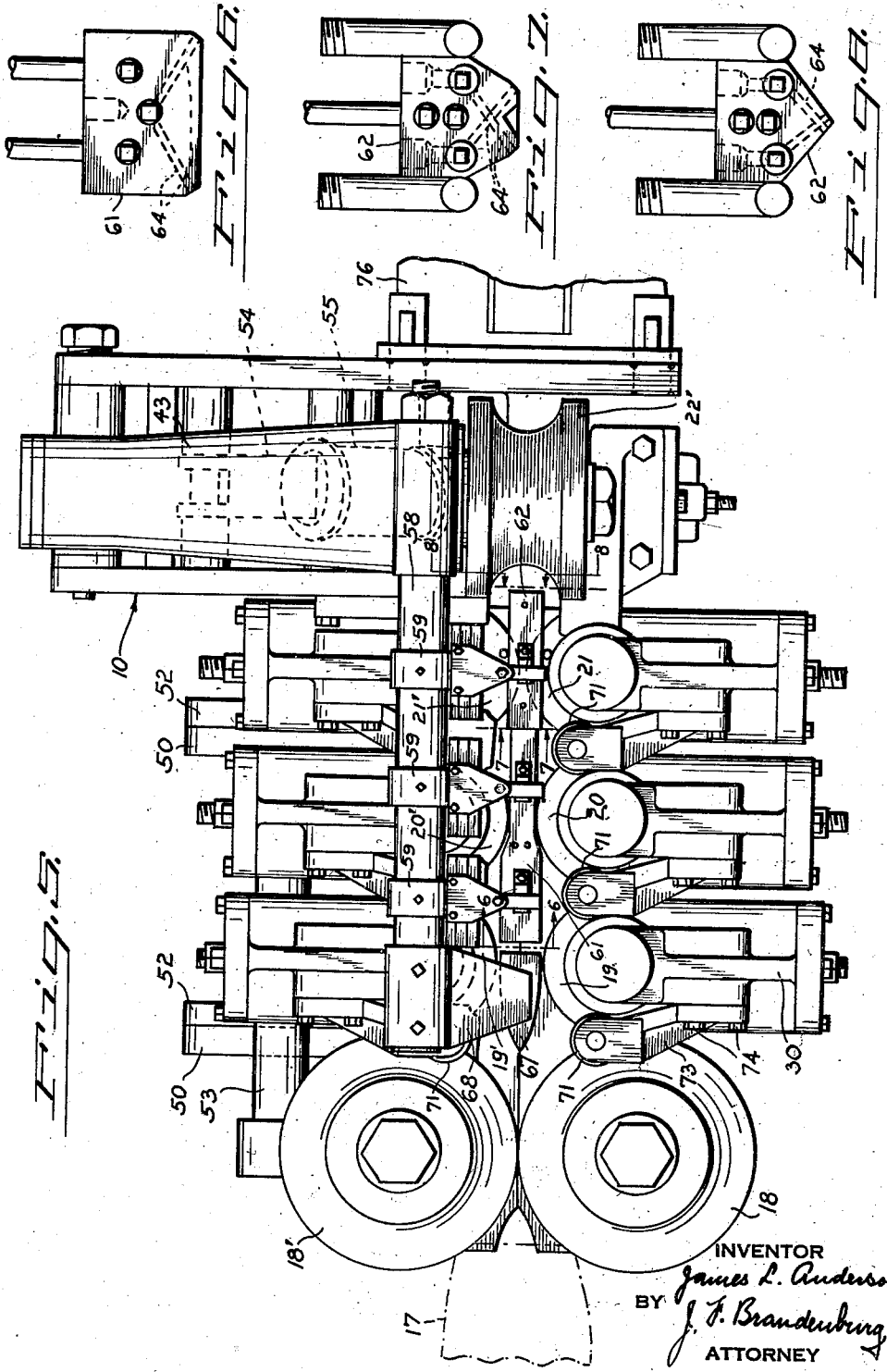

Patented Mar. 13, 1945

2,371,209

UNITED STATES PATENT OFFICE 2,371,209

SKELP WELDING UNIT WITH ROLLS

James L. Anderson, Closter, N. J., assignor to Air Reduction Company, Incorporated, New York, N. Y., a corporation of New York Application September 17, 1940, Serial No. 357,111

6 Claims. (Cl. 78—87)

This invention relates to machines for making welded tubes from flat skelp, and more especially to welding machines in which the skelp is formed and welded in successive roll passes.

It is an object of the invention to provide an improved welding machine in which skelp is formed and the edges of the skelp are heated locally to a welding temperature by heating jets projected against the edge faces during the time that the skelp is being formed by passage through successive roll passes.

One feature of the invention relates to an improved construction of the roll-supporting frame for opening the roll passes simultaneously for the admission of a pulling tool. Guide rolls located between forming roll stands open with the forming rolls. According to the terminology of this specification, a "set" of rolls is a number of rolls in position to contact with the tube blank at substantially the same region crosswise of the tube blank, and defining a pass through which the tube blank travels. A roll "stand" includes the set and the supporting means for the rolls of the set. Different stands can be, and in the case of this invention are, supported from the same welding machine frame.

Another object of the invention is to provide a forming and welding machine for bending and welding heavier stock than that used for welded pipes and tubes of the prior art.

Other features of the invention relate to the elliptical forming of the tube for holding it straight in the rolls, to the protection of the torch from being struck by the end of the skelp as the end enters the machine, and to roll opening mechanism that automatically locks when the rolls reach closed position.

Another object of the invention is to provide improved forming and/or guiding means for a tube blank. It is common practice to employ rolls with recessed faces for forming or confining a tube blank preparatory to welding, and it is advantageous to have such rolls contact with the surface of the tube blank around all or most of the periphery of the tube blank. In accordance with one feature of this invention additional contact with the tube blank is obtained between the roll stands with intermediate rolls that are narrower and of smaller diameter than the principal forming rolls and that are located between the principal rolls of successive roll stands extending into the recesses in the faces of the principal rolls.

Other objects, features and advantages of the invention will appear or be pointed out as the specification proceeds.

In the accompanying drawings, forming part hereof:

Fig. 5 is a top plan view of the machine shown in Fig. 1.

Figs. 6–8 are enlarged views of the torches and are taken on the lines 6—6 to 8—8, respectively, of Fig. 5.

Figure 1:
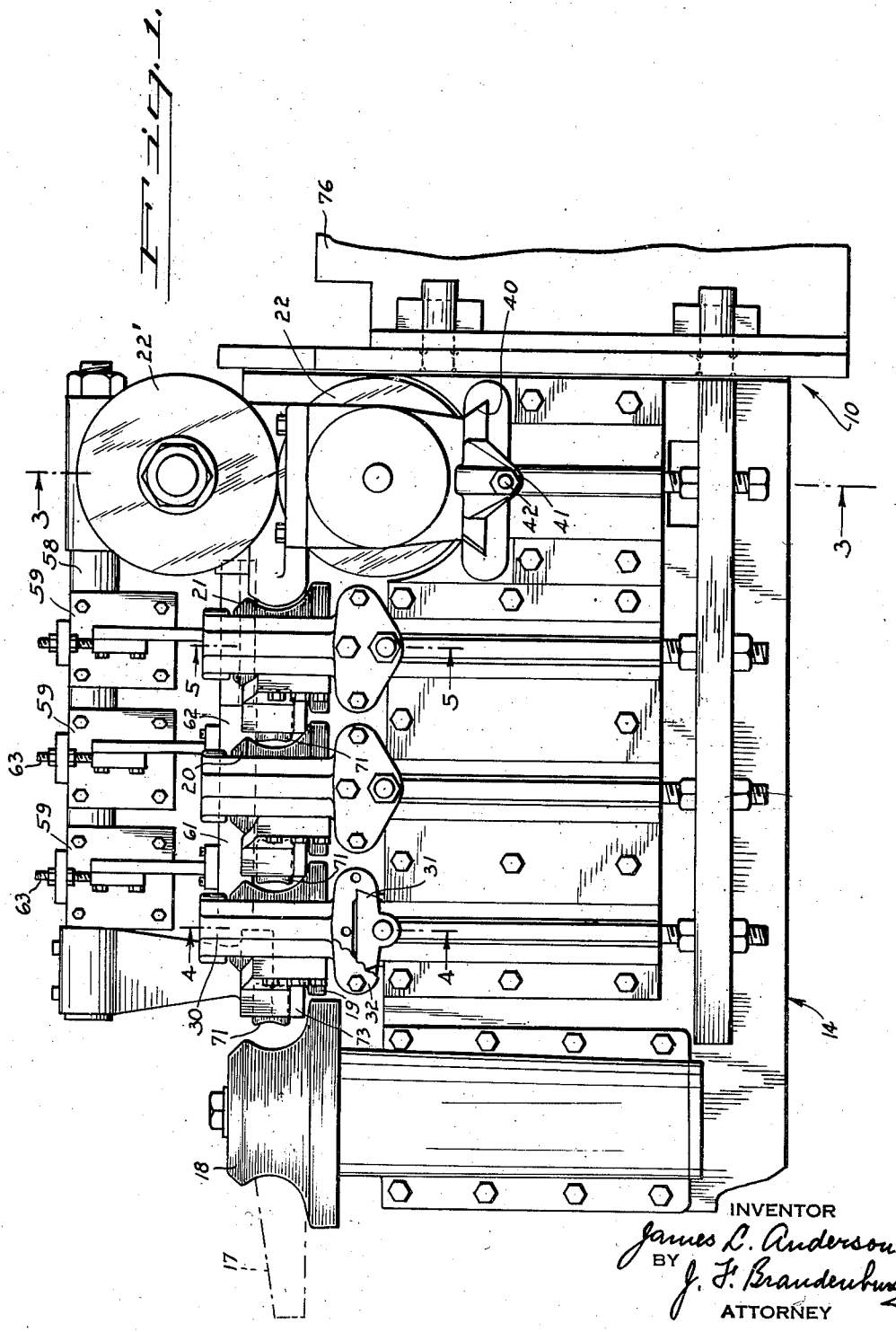
Fig. 1 is a side elevation of a tube welding machine embodying the invention.

A stationary frame 10 has bearings 11 (Fig. 2) for a shaft 12 that extends along the entire length of the machine. A tilting frame 14 has lugs 15 by which the frame 14 is supported from the shaft 12. The rolls on one side of the machine are supported by the stationary frame 10, and the rolls on the other side by the tilting frame 14.

Figure 3:
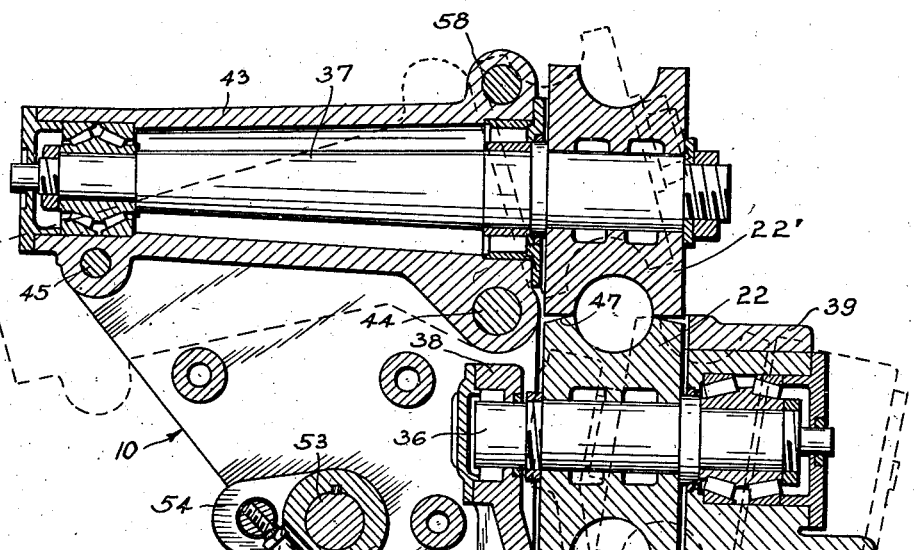
Fig. 3 is a sectional view taken on the line 3—3 of Fig. 1, but on the same scale as Fig. 2.

In the illustrated embodiment of the invention, the skelp 17 (Fig. 5) travels through a number of roll stands while being made from a flat strip to a welded tube. The first roll stand includes two forming rolls 18 and 18' defining a roll pass in which the flat skelp receives its initial bending. Beyond this forming pass there are three sets of other forming or gathering rolls 19, 19'; 20, 20'; and 21, 21' (Fig. 5), which continue the forming of the tube blank preparatory to its entry into the pass between the welding rolls 22, 22' (Fig. 3).

The roll 18' of the first forming pass is connected to a shaft or spindle 24 (Fig. 2) which turns in anti-friction bearings in a housing 25 that forms a part of the stationary frame 10. The other roll 18 of the first pass is connected to a similar shaft that turns in bearings in a housing 27 that is bolted to and forms a part of the tilting frame 14.

Figure 4:
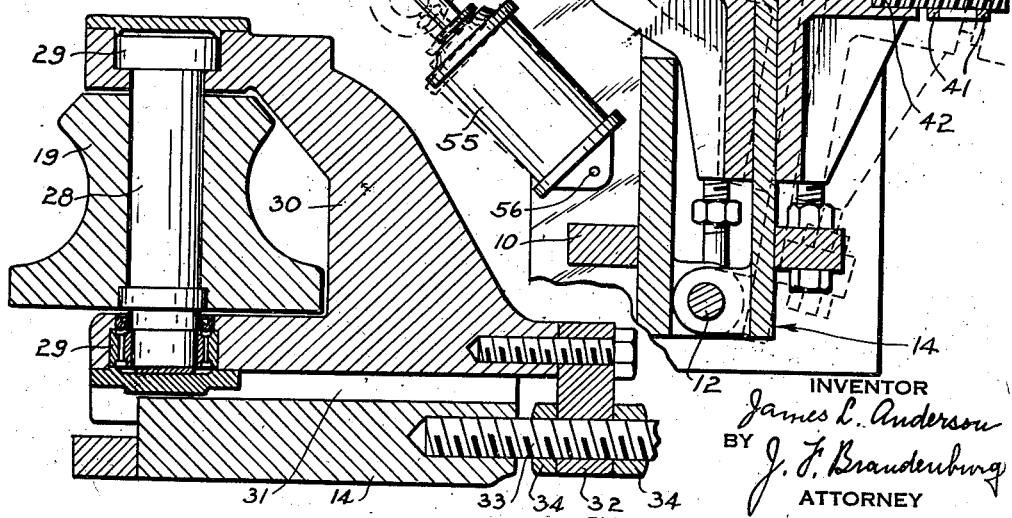
Fig. 4 is a detail sectional view on the line 4—4 of Fig. 1.

The gathering roll 19 is supported by a shaft or spindle 28 (Fig. 4) that turns in bearings 29 in a casting 30 which slides on a dovetail bearing 31 (Fig. 1) on the tilting frame 14. The casting 30 is moved back and forth on the pass between the rolls 19 and 19'. A plate 32 attached to the casting 30 extends downward, as shown in Fig. 4, and a stud 33 anchored in the frame 14 passes through an unthreaded opening in the plate 32. Nuts 34 threaded on the stud 33 on either side of the plate 32 hold the casting 30 in any set position and these nuts can be moved to shift the casting 30 into other positions to adjust the roll pass.

The other gathering rolls 20 and 21 are similarly supported from the tilting frame, and are similarly adjustable. The gathering rolls 19', 20' and 21' are supported by the stationary frame with the same kind of bearings and adjusting means as the rolls 19, 20 and 21.

The welding rolls 22 and 22' (Fig. 3) are supported on horizontal spindles or axles 36 and 37, respectively. The axle 36 turns in bearings in brackets 38, 39 that are connected to the tilting frame 14. The bracket 39 is movable in a dovetail bearing 40 (Fig. 1) on the frame 14 to obtain a limited transverse adjustment of the welding roll 22. Nuts 41 on a stud 42 hold the bracket 39 in position, as shown in Fig. 3.

The spindle or axle 37 of the upper welding roll 22' turns in bearings in a housing 43 that is connected to the stationary frame 10 by a pivot 44. The housing 43 can move about the pivot 44 into the dotted-line position shown in Fig. 3 but is held in the full-line position by a tapered pin 45 that extends through alined openings in the housing 43 and stationary frame 10. The pin 45 is removed only in the case of a cobble which makes necessary the opening of the welding roll pass further than is required for the insertion of a pulling tool during the ordinary operation of the machine.

Figure 2:
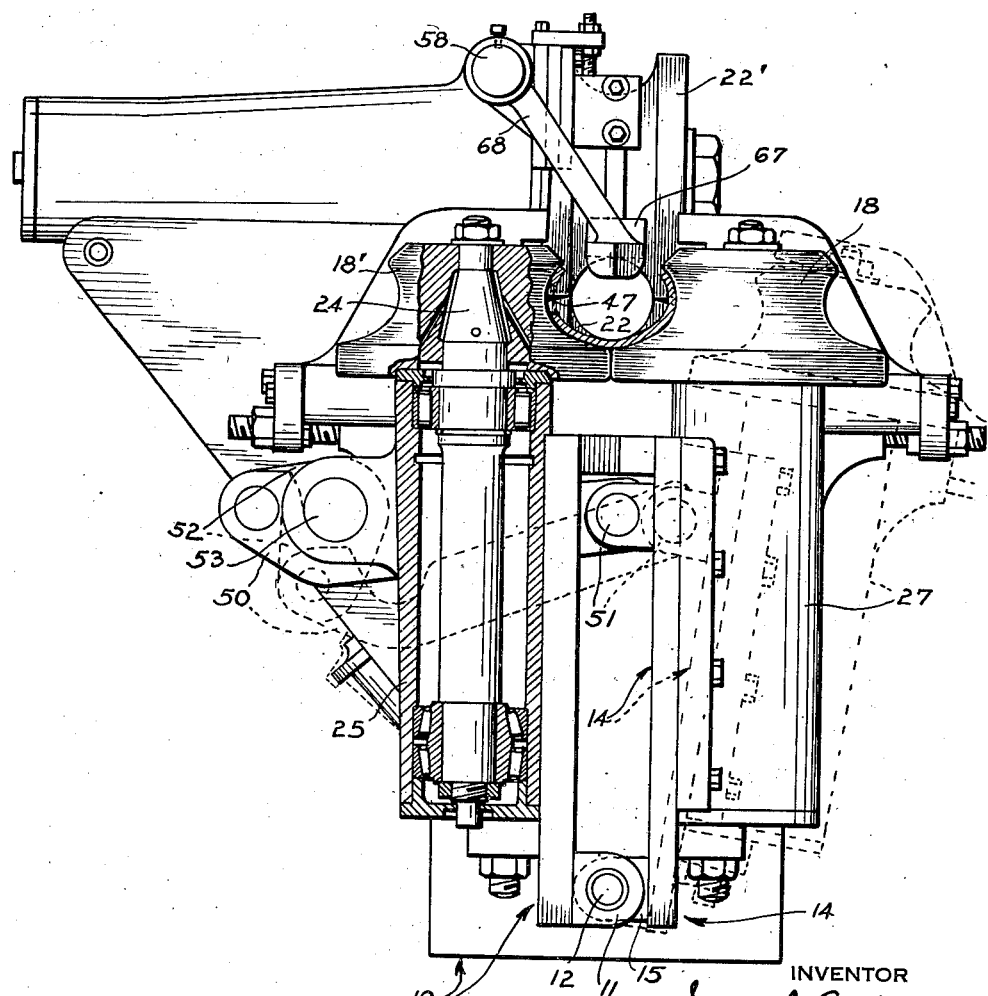
Fig. 2 is a slightly enlarged front view, partly in section, of the machine shown in Fig. 1, but with skelp shown in the forming roll pass, and with all of the rolls between the first and last roll passes omitted in order to simplify the drawing and better illustrate the welding roll pass.

When a new length of skelp 17 is to be pulled into the machine, the tilting frame 14 is tilted into the positions shown in dotted lines in Figs. 2 and 3. This movement opens up all of the roll passes and permits a pulling tool, that has one end connected to the skelp, to be laid in the groove of the lower welding roll 22 and between the rolls of the forming roll passes.

The lower welding roll 22 has a bevel peripheral face 47 which provides the clearance necessary to enable the lower welding roll 22 to shift about the axis of the shaft 12 without moving the upper welding roll 22'.

The frame 14 is tilted to open the roll passes to receive a pulling tool, and is returned to upright position to close the passes, by links 50 connected to the tilting frame by pins 51 and connected at their other ends to cranks 52 that are keyed to a shaft 53. The cranks 52 move over their dead-center position when the tilting frame is upright and thus lock the roll passes closed. The shaft 53 turns in bearings that are a part of the stationary frame 10 and has a crank 54 (Fig. 3) connected with the piston rod of a fluid motor 55. A pivot 56 connects the motor 55 to the stationary frame 10.

A torch supporting bar 58 fits into a socket in the housing 43 and extends lengthwise of the machine over the rolls 19'—21'. Torch holders 59 (Fig. 5) on the bar 58 support torches 61 and 62 in positions to project heating jets, preferably oxyacetylene flame jets, directly against the edge faces of the forming tube blank as it travels through the machine. Each of the torch holders has a screw 63 (Fig. 1) for adjusting the height of the torch 61 or 62 with respect to the tube blank.

Figs. 6, 7 and 8 show the torches 61 and 62 with diverging jet passages 64 which are at smaller angles nearer the region of welding because of the narrowing of the gap between the edge faces.

A tip protector 67 is located in front of the torch 61 to prevent the torches from being struck by the end of the skelp 17 if the end is irregular or if it enters the machine improperly. The tip protector 67 has a pointed end against which the skelp strikes a glancing blow if it strikes the protector. A bracket 68 extending downward from the torch supporting bar 58 holds the tip protector 67 in position.

The contour of the faces of the forming rolls 18 and 18' is such that they bend the skelp 17 to an elliptical arc, as shown in Fig. 2, with the major axis of the ellipse transverse. There is a wide space between the edges of the partially-formed skelp as it travels through the first forming roll pass, but the edge portions of the skelp are above the major axis of the ellipse. Therefore, the partially-formed skelp will not rise in the roll pass because doing so would cause the metal to be bent more sharply.

The elliptical contour also serves to prevent the tube blank from turning as it travels through the forming and welding passes. This is important because the edge faces of the skelp will not remain in the correct relation to the torches if the tube blank turns in the roll passes.

The subsequent forming roll passes defined by the gathering rolls 19, 19', 20, 20', and 21, 21', each bend the partially-formed tube nearer to circular contour and bring the edge faces nearer together.

To assist in forming the tube and to maintain the edge faces straight between the rolls 18, 18' to 21, 21', guide rolls 71 (Fig. 5) are positioned just ahead of each of the rolls 19, 19' to 21, 21'. The rolls 71 are of much smaller diameter, preferably about one-half of the diameter of the rolls 19, 19' to 21, 21' so as to fit into the space between the latter. The term "diameter," as here used, means maximum diameter. The faces of the rolls 71 are curved to fit the contour of the tube blank, and the peripheral portions of the rolls 71 extend into the recesses in the faces of the gathering rolls.

The roll 71 just ahead of the gathering roll 19 is carried by a bracket 73 which is fastened to the casting 30 by screws 74. These screws 74 extend through short slots in the bracket to allow for some adjustment of the bracket 73 with respect to the casting 30. The bracket 73 is preferably adjusted so that the roll 71 and the corresponding roll on the other side of the tube blank define a pass slightly larger than the pass between the rolls 19 and 19'.

All of the other rolls 71 are similarly connected to the castings that support the rolls of the next roll passes and are similarly set to define progressively narrower passes. The same movement of the supporting castings that adjusts the positions of the larger rolls also adjusts the spacing of the rolls 71.

From the pass defined by the gathering rolls 19, 19' until the seam approaches the welding roll pass, the edge faces are heated by the flame jets projected directly against the edge faces. The skelp is pulled through the forming and welding machine by a drawbench 76 at a speed so coordinated with the heating effectiveness of the torches that the edge faces of the tube blank are raised to a welding temperature by the time they are brought together by the welding rolls.

The number of roll stands can be changed, and other changes and modifications can be made in the illustrated embodiment of the invention and some features can be used without others.

I claim:

1. In a tube welding machine, a torch holder that positions a torch along the course of travel of the edges of a tube blank for raising the edges to a welding temperature progressively along their length, roll stands through which the tube blank passes, including welding rolls, and forming rolls ahead of the welding rolls, means on which the rolls are rotatably supported including a common frame that carries the supporting means of one of the welding rolls and the supporting means for the forming rolls on one side of a tube blank, and means for tilting said frame to open all of the roll passes simultaneously for insertion of a pulling tool.

2. A tube welding machine including a set of forming rolls, three sets of gathering rolls, torches located in position to project heating flames directly against the edge faces of a tube blank as it travels through the passes between the gathering rolls, a set of welding rolls beyond the last gathering roll pass and at the end of said torches, spindles for the respective rolls, the spindles of the forming and gathering rolls being substantially vertical and those of the welding rolls horizontal, a fixed frame supporting the vertical spindles on one side of the machine and the upper horizontal spindle, a tilting frame supporting the vertical spindles on the other side of the machine and the lower horizontal spindle, and a shaft extending lengthwise of the machine and supporting the tilting frame and about which the tilting frame is movable to shift the spindles transversely of the machine to open the passes between all of the sets of rolls.

3. A tube welding machine through which successive lengths of skelp are pulled by a tool, said machine including successive roll stands for forming a tube blank, means for holding a torch in position to project heating jets against the tube blank along its edges as the blank is formed and the seam edges move progressively closer, and a guard that has a rearward end at least as wide as the forward end of the torch and that is positioned directly in front of the torch, said guard having a pointed forward end extending away from the position occupied by the torch for deflecting the end of a skelp to prevent the skelp from striking the end of the torch.

4. Tube welding apparatus including a number of roll stands through which a tube blank passes successively, said stands including rolls that define alined passes and each of said stands having at least one roll that is movable to open the pass for the insertion of a pulling tool, and common operating mechanism connected to all of the movable rolls, including a linkage with a crank that moves over its dead-center position to lock the roll passes closed.

5. In a tube welding machine, a torch holder that positions a torch along the course of travel of the edges of a tube blank for raising the edges to a welding temperature progressively along their length, roll stands through which the tube blank passes, welding rolls, and a plurality of gathering roll stands ahead of the welding rolls, each of said roll stands including two gathering rolls, an independent slide on which each of the gathering rolls is supported, separate adjusting means for shifting each of said slides toward or from the other slide to regulate the width of the pass defined by the gathering rolls, a bracket rigidly attached to each of the slides, and a guide roll carried by each bracket in such position that the guide rolls contact with the outside surface of the tube blank and define a pass of slightly different width from the gathering roll pass to assist in the forming of the tube.

6. In a machine for making welded tubing from heavy, stiff, flat skelp, a first forming stand comprising rolls defining an open top pass of non-circular contour with its maximum dimension transverse and its line of contact with the skelp below said maximum dimension substantially less than the total width of the skelp with which the machine is intended to be used, a guard between the rolls of said first forming stand, the guard having a pointed end extending in the direction from which the skelp approaches said forming stand for deflecting skelp that enters the machine crooked and unsymmetrical with respect to the maximum dimension of the pass through said first forming stand, and subsequent stands including rolls that bend the skelp further and eventually to circular contour.

JAMES L. ANDERSON.